United States Patent [19]
Thøgersen et al.

[11] Patent Number: 5,513,284
[45] Date of Patent: Apr. 30, 1996

[54] METHOD AND A DEVICE FOR CORRELATING TWO OR MORE OPTICAL PULSE SIGNALS

[75] Inventors: Jan Thøgersen, Aarhus; Jannik Mark, Rungsted Kyst, both of Denmark

[73] Assignee: Lycom A/S, Brondby, Denmark

[21] Appl. No.: 347,356

[22] Filed: Feb. 1, 1995

[30] Foreign Application Priority Data

Jun. 16, 1992 [DK] Denmark ................................. 0797/92

[51] Int. Cl.$^6$ ................................................. G01J 11/00
[52] U.S. Cl. ................... 385/12; 250/227.14; 250/484.4; 250/550; 356/345; 385/142
[58] Field of Search ................................. 385/12, 13, 15, 385/27, 123, 141–143; 356/35.5, 345, 354–360, 448, 229, 230; 250/550, 227.12, 227.14, 483.1, 484.4, 484.5

[56] References Cited

U.S. PATENT DOCUMENTS

| | | | |
|---|---|---|---|
| 4,216,474 | 8/1980 | Levine | 342/201 |
| 4,725,728 | 2/1988 | Brininstool et al. | 356/35.5 |

FOREIGN PATENT DOCUMENTS 0388945  9/1990  European Pat. Off. .

OTHER PUBLICATIONS

Österberg, Ulf, et al. "Autocorrelation of Short Pulses . . ." *IEEE Journal of Quantum Electronics*, vol. 24, No. 10 (10 Oct. 1988), pp. 2127–2129.

Simon, Peter, et al. "A single-shot autocorrelator for UV . . ." *Measurement Science & Technology*, vol. 1, 1990, (United Kingdom), pp. 637–639 (No Month).

Gabla, P. M., et al. "Practical Implementation of a Highly Sensitive . . ." *IEEE Photonics Technology Letters*, vol. 3, No. 8, (Aug. 1991), pp. 727–729.

*Primary Examiner*—John D. Lee
*Attorney, Agent, or Firm*—Ladas & Parry

[57] ABSTRACT

The object of the invention is to provide a method which makes it possible to determine the correlation between two optical signals, which makes it possible to correlate two optical signals, without using a crystal element which is associated with a plurality of drawbacks, because the components are quite expensive. It has been found possible to replace a frequency doubling crystal by an active, optical wave guide, e.g. in the form of an active, optical fiber, said wave guide transmitting fluorescence which is intensity-related to the arrived signal. When this fluorescence is detected in spectral bands, e.g. in the blue region of the visible light, an image of the strength of the arriving signal may be formed. Current distance delaying of the two correlated signals makes it possible to produce an image of the correlation between the signals.

10 Claims, 5 Drawing Sheets

METHOD AND A DEVICE FOR CORRELATING TWO OR MORE OPTICAL PULSE SIGNALS

The invention concerns a method of correlating two or more optical signals as stated in the introductory portion of claim 1, as well as a device for correlating two or more optical signals and of the type stated in the introductory portion of claim 2.

Within the field of optical high rate systems it is often necessary to obtain knowledge of the shape of the signal pulses. If in an optical communications system it is no longer possible to detect a signal, the reason will frequently be interference with the signals en route in the system, e.g. dispersion fading. Usually, it is not possible to use conventional measuring equipment, because typically the pulse widths of high rate systems will be less than 500 picoseconds and are expected to gradually approach pulse widths of the order of 5 femtoseconds.

It is well-known to obtain this information by correlating two signals—either two copies of the same signal (autocorrelation)— or two signals, where one is to be measured and the other is a well-known reference signal (cross-correlation). This is obtained by using a photoactive element in the form of a frequency doubling crystal which generates second harmonic oscillations of the incident light signal. This entails that the incident light, which usually has a wavelength of e.g. 1550 nm, is converted to light at a wavelength of 775 nm.

The intensity of the second harmonic oscillations depends upon the intensity of the incident light e.g. to the second power. When the two signals are delayed temporally during the measurements, e.g. by changing the distance travelled, the correlation between the two signals can be determined, and thus the pulse shape of the measured signals can be determined by applying mathematical analysis to the measurement result.

However, the use of the frequency doubling crystals is associated with a plurality of drawbacks, because the components are quite expensive. The cystals are vulnerable to scratches and mechanical stress. Some of the crystals are moreover hygroscopic. For the crystals to be coupled to the optical system, it is necessary to use expensive bulk optical devices. To achieve the necessary phase matching, the components must be aligned very accurately, which means the use of an optical table in practice. This technique is therefore only useful in connection with laboratory tests and can be used only with great difficulty in connection with measurements in the field.

The article "Autocorrelation of short pulses using a single-mode fiber" by Ulf Österberg and Walter Margulis in IEEE Journal of Quantum electronics, vol. 24, No. 10 Oct. 1988 discloses an autocorrelation principle, comprising measuring transmitted light from a single mode fibre, said light being provided by interaction between the incident light in the fibre and the electrons in the germanium atoms of the core. The germanium atoms are used for obtaining a refractive index difference between the core and the cladding. The SHG principle has several drawbacks, the most essential one being that it operates only at three wavelengths, viz. 647.5 nm, 1064 nm and 1319 nm, and none of these is readily useful in connection with 1550 nm, which is the preferred wavelength in optical communication. Another considerable drawback is that there is no linear correlation between the intensity of the input signal and the fluorescence. The SHG autocorrelation is limited To a narrow wavelength region determined by the phase matching requirements. This type of autocorrelation cannot be applied to pulses which are shorter than 1 ps.

The object of the invention is therefore to provide a method, which makes it possible to determine the correlation between two optical signals, and the method must be capable of being adapted to arbitrary wavelengths in the optical region, without using a crystal element which requires an expensive measurement setup.

This object is achieved as stated in the characterizing portion of claim 1. The method comprises using an active, optical wave conductor for generating fluorescence. The wave conductor is doped with active ions, which are known i.a. from optical amplifiers.

It has been found possible to replace the frequency doubling crystal by an active, optical wave guide, e.g. in the form of an active, optical fibre, the wave guide transmitting fluorescence which is intensity related to the arriving signal. When this fluorescence is detected in spectral bands, e.g. in the blue region of the visible light, an image of the strength of the arriving signal can be formed. Current distance delay of the two correlated signals makes it possible to generate an image of the correlation between the signals. The fluorescence is preferably produced by a multi-photon process in the active ions in the wave guide. The intensity of an N-multi-photon process depends upon the $N^{th}$ power intensity of the arriving signal.

The invention moreover concerns a device as stated in the characterizing portion of claim 2, which makes it possible to perform the method stated in claim 1.

If the wave guide is an active, optical fibre, the detector is preferably arranged as stated in the characterizing portion of claim 3. The doping material is preferably selected as stated in claim 4, providing a strong intensity-related fluorescence. The signals preferably have a pulse width as stated in claim 5, but other pulse widths may be used.

The distance delay of the optical signals is preferably provided by transmission fibres as stated in claim 6, since this enables easy coupling to the wave guide if it is an active, optical fibre. Then, a piezoelectric crystal may advantageously be arranged in one transmission fibre to control the delay, as stated in claim 7.

The device defined in claim 8 splits a signal into two identical signals, which makes it possible to autocorrelate the signal concerned. It is hereby possible to obtain information on the envelope of the signal as well as the frequency chirp of the enveloped carrier signal.

The device defined in claim 9 enables using a reference signal well-known in advance, by means of which the cross-correlation between the reference signal and the measurement signal is determined. If the reference signal is a delta signal, the cross-correlation between the two signals will be an image of the signal to be determined. The device defined in claim 10 uses the cross-correlation between two signals, one of which is a reference signal, for generating a clock signal for the other signal. This technique may be used in a receiver unit for optical high rate signals. On the basis of a received data signal it is hereby possible to generate a clock signal for it.

The invention will be described more fully below in connection with preferred embodiments and with reference to the drawing, in which FIG. 1 shows an energy level diagram of $Er^{3+}$ ions;

Figure 1:
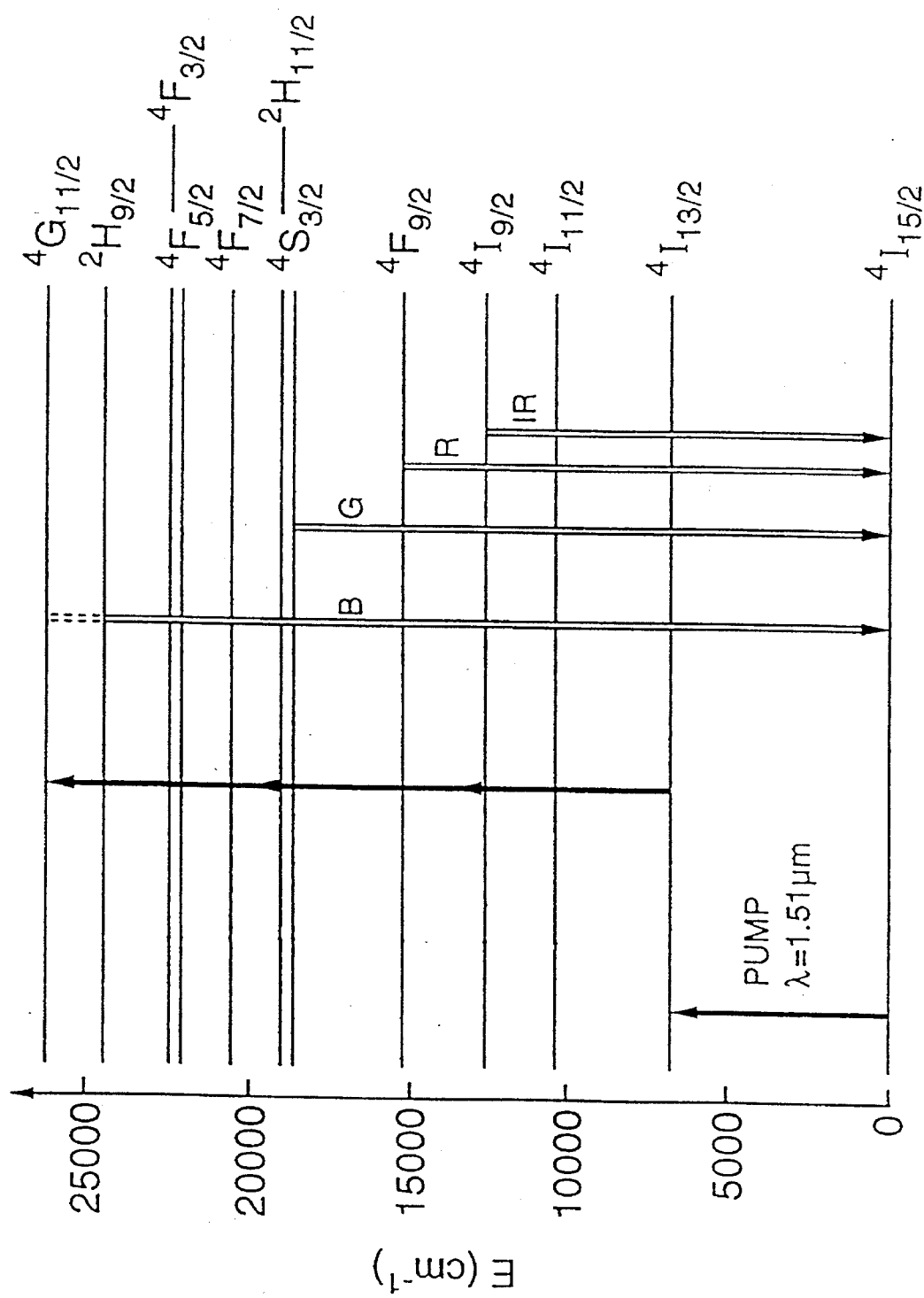

FIG. 1 shows the level diagram of $Er^{3+}$. The preferred embodiment of the invention uses light having a wavelength in the region around 1550 nm (1500–1600 nm), which is used for optical communication. When $Er^{3+}$ is used as the active material and light at 1550 nm as excitation energy, excitation of $Er^{3+}$ is obtained to a first excited level designated $^4I_{13/2}$. Owing to the long life (about 11 ms) of this level a considerable population is obtained in this level even for small average powers (typically 0.1 mW) of light at 1550 nm. $Er^{3+}$ can now be excited from this first excited level by multi-photon processes. This type of processes is described in Fahrad Faisal: "Theory of Multi-photon Processes," Plenum Press. As an example, the diagram in FIG. 1 shows a three-photon absorption process from this first excited level $^4I_{13/2}$. Such a process requires simultaneous, coherent interaction of three photons with the Er ion; but it is not necessary that the Er ion includes energy levels corresponding to the absorption of one or two photons. The Er ion will now be excited to a higher excited state e.g. the level designated $^4G_{11/2}$ in the figure. From this level or after a radiation-less transition to a lower level, the Er ion can now transmit blue light having a wavelength around 400 nm.

The probability of the process described here and thus the intensity of the transmitted blue light depend upon the peak intensity of the incident light to the third power. However, for a multi-photon process to proceed, the arriving photos must be in phase, since, otherwise, destructive interference will occur.

It is essential to note that the intensity of the blue fluorescence from the Er ions in the multi-photon process described here depends on the peak intensity of the incident light to the third power. The process is not restricted to Er ions or light having a wavelength around 1550 nm. Most rare earths have several closely spaced levels which make them useful for generating light by multi-photon processes. Nor is it essential that a three-photon process is used. For example a two-photon process in erbium will lead to fluorescence at about 550 nm. The probability of such a process depends on the intensity of the incident light to the second power. Generally, n-photon processes (n an integer) can be used in rare earths, where the intensity of the fluorescence light depends on the peak intensity of the incident light to the $n^{th}$ power.

For example in Er doped fibres there are processes competing with the mentioned two- and three-photon processes. Cooperative upconversion, where two closely spaced Er ions both excited to the level $^4I_{13/2}$ can exchange energy, so that one ion decays to the basic state $^4I_{15/2}$, while the other ion is excited to a higher level, where the electron either decays by transmission of IR light or decays without radiation. Such a process greatly depends on the Er ion concentration. To avoid such processes an optical fibre or wave conductor must not be too highly doped with Er, since the individual Er ions can then exchange energy. Typically, the concentration of Er ions in an optical fibre is to be around $1.3 \times 10^{18}$ cm−3. If an Er doped optical fibre is used for detection of light by a multi-photon process, typical parameters of the fibre will be: the fibre core will have a diameter of about 3 μm, and the refractive index difference between the core and the cladding will be about 0.01 to 0.03.

Figure 2:
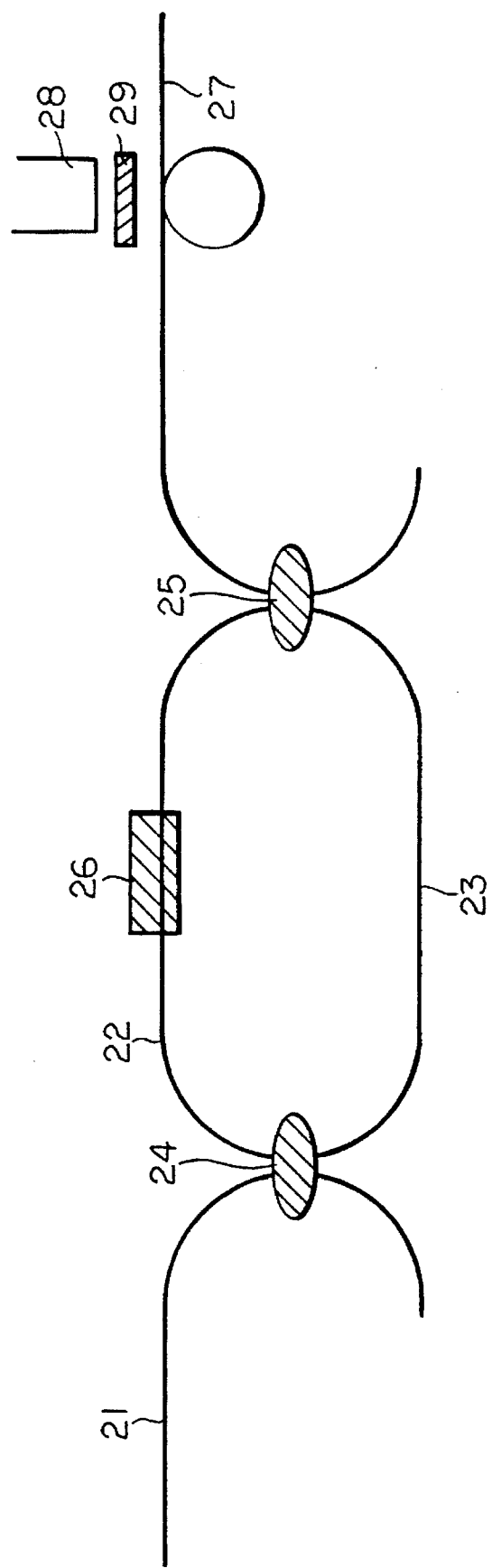
FIG. 2 is an outline diagram of an embodiment of an autocorrelator according to the invention.

FIG. 2 shows an embodiment of an autocorrelator for detection of pulse width and phase chirp. A periodic flow of pulses is transmitted into an optical fibre 21 called the input fibre. The flow of pulses is divided in a fibre optical coupler 24, such that equal amounts of the intensity of the light are transmitted into two other optical fibres 22 and 23, which constitute two arms of a fibre optical interferometer. A piezoelectric crystal 26 capable of stretching the fibre is inserted in one arm 22. This is merely an example of a method by means of which the optical distance in one arm may be varied with respect to the other. Other distance regulating elements may be used. The two pulse flows are united again with a second fibre optical coupler 25, but now the pulses in the two flows will be delayed with respect to each other owing to the different distances they have travelled. Finally, the light pulses are transmitted into an Er doped optical fibre 27. For example the blue light from a three-photon process is detected from here using a sensitive detector, e.g. a photomultiplier tube (PMT) 28. An optical filter 29 may be arranged in front of this so that only the blue light is detected.

The intensity of the blue fluorescence light detected in this manner now depends on the overlap which will exist between the pulses from the two flows in the interferometer. If the overlap is great, i.e. pulses from the two flows arrive simultaneously at the coupler 24 (the delay time is 0), there will be a high intensity of light and thus a strong blue fluorescence, but if the overlap is small (i.e. the delay time is great) no or only little light can be detected.

The autocorrelation function of the pulses can be detected by varying the optical distance in the one arm 22 in the fibre optical interferometer. During the detection the optical distance is varied in the one arm 22 in the fibre optical interferometer in a plurality of steps. The fluorescence intensity is detected at each step. To ensure correct measurement, the measurement in each step must not be of a shorter duration than the life of the fluorescence, i.e. detection is to be performed at each point for a longer duration than 10 μs in the embodiment discussed. Typically, it is necessary to measure on a pulse train having at least one million pulses for each step, which, of course, depends on the repetition frequency.

Figure 3:
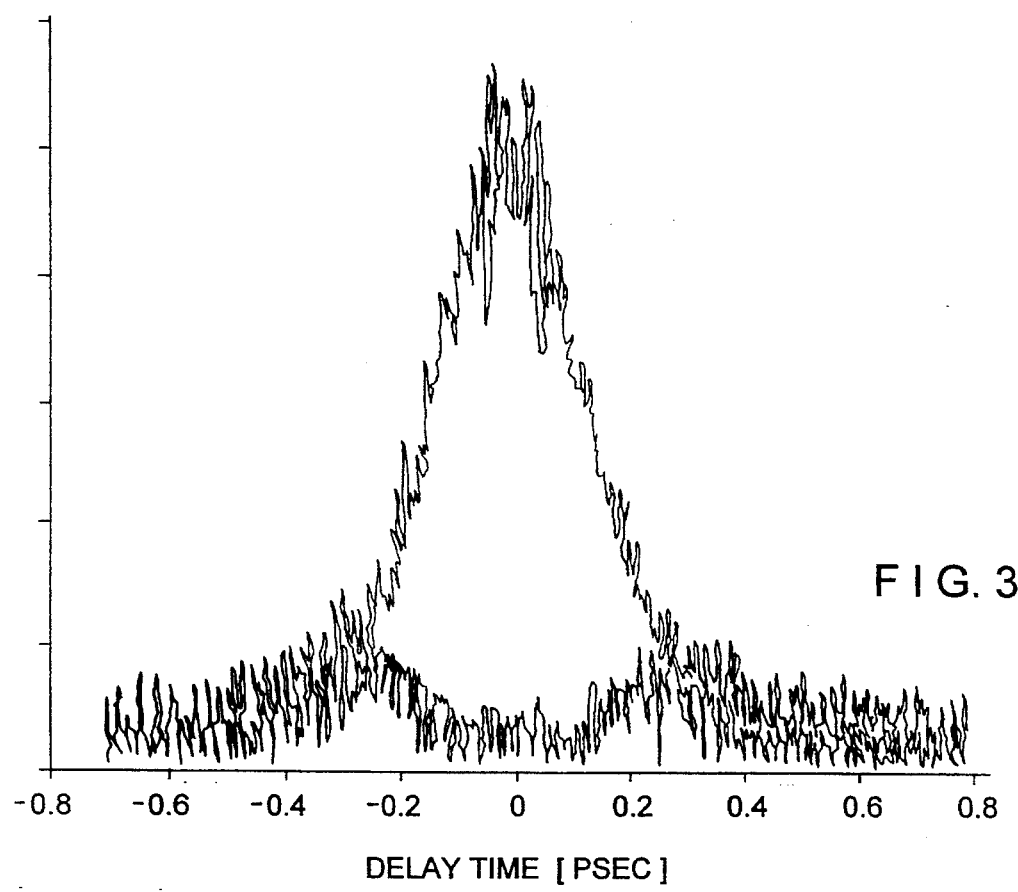
FIGS. 3 and 4 show the autocorrelation of a signal collected with the principle shown in FIG. 2 and a theoretically computed image of the autocorrelation of the same signal, respectively.
Figure 4:
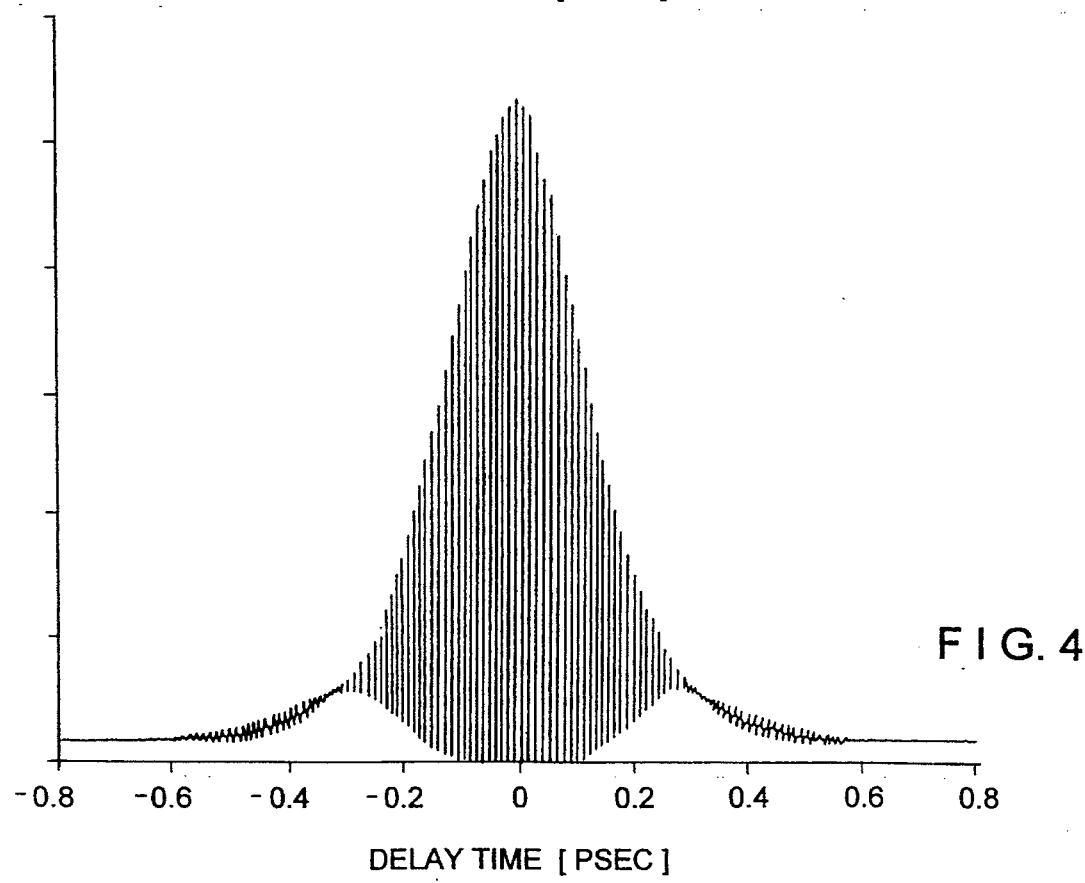

An example of such a measurement is shown in FIG. 3. This figure shows an experimental measurement, in which the fibre interferometer is replaced by bulk optical instruments. This setup is not illustrated, but corresponds in principle to the setup shown in FIG. 2, but owing to the understanding the invention is explained in connection with a fibre optical interferometer. The actual detection is performed using an Er doped optical fibre. FIG. 4 shows a theoretical computation of the corresponding experiment. There will be a background of light for long delay times (0.8 ps), and for a delay time 0 there is a strong peak in the envelope of the measured light intensity. Owing to different phase of the light through the light pulse used, something resembling a raised background will be seen for medium delay times, about 0.4 ps. The envelope function of the measured fluorescence provides a measure of the original pulse width. In this case it will be seen that the width of the autocorrelation function of the pulses is about 0.6 ps, and at the same time it is possible to give a measure of the phase chirp which is present in the original pulse at the raised background for medium delay times.

Typical pulse widths that can be detected with the method described here is 100 ps to 0.05 ps.

When very short pulses, e.g. 0.1 ps, are detected, dispersion in the fibre is to be taken into consideration, because when passing through the fibre the pulse broadens. The fibres used can be designed such that the dispersion is minimum and does not destroy the pulse prior to the detection.

The theory of interferometrical autocorrelators prepared for bulk optical instruments and for frequency doubling crystals can be applied directly to the autocorrelator type described here. This theory is described e.g. in K. L. Sala et al. IEEE, Journal of Quantum Electronics, Vol. QE-16, No. 9, pp 990–996, 1980.

It should be mentioned e.g. that the contrast ratio, i.e. the radio of the peak at 0 in the delay time to the background, depends on the type of multi-photon process which is used. The contrast radio is $2^{(2n-1)}$ i.e. for a three-photon process the contrast ratio is 32.

Figure 5:
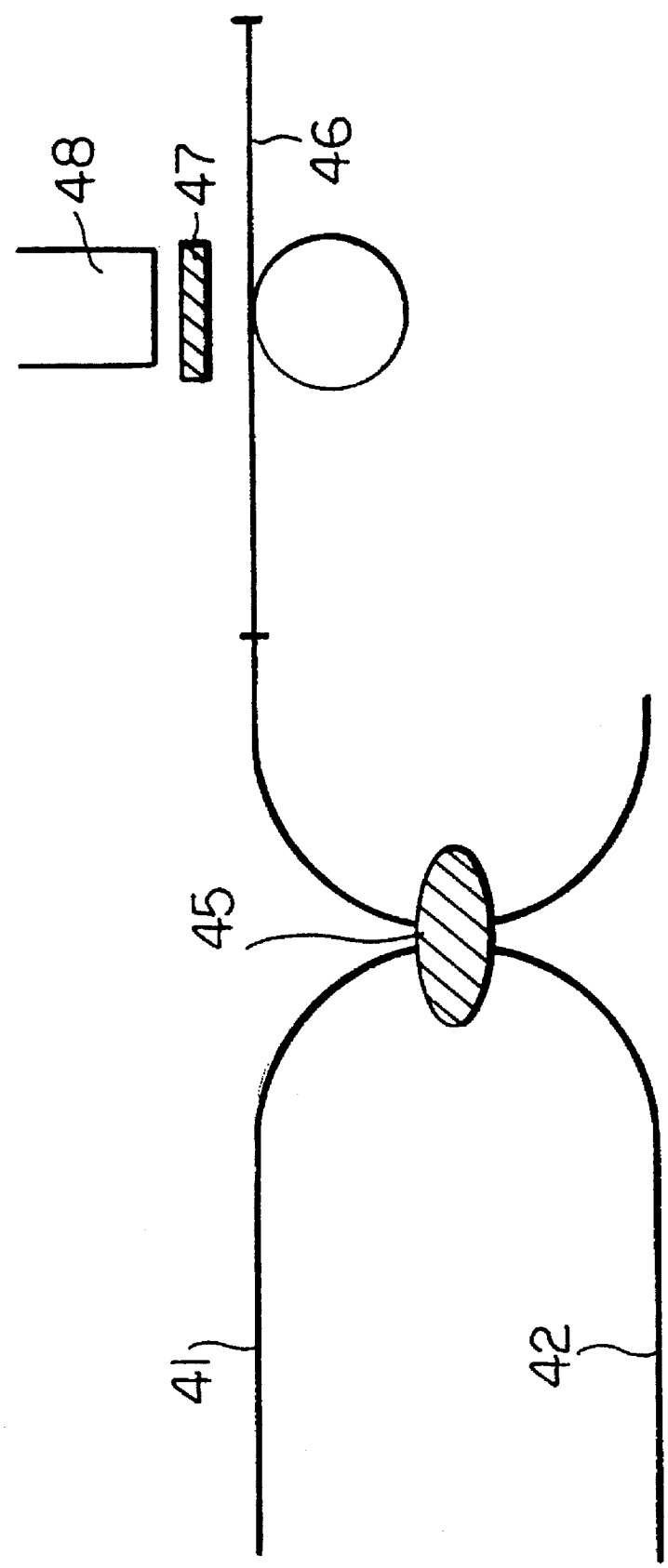
FIG. 5 is an outline diagram of an embodiment of a cross-correlator according to the invention.

FIG. 5 shows the principle in a cross-correlator. Here the pulse is not correlated with itself, but with a known other pulse. It is an advantage that the known pulse is short with respect to the pulse it is desired to measure, since the signal is then obtained as fluorescence directly reflects the shape of the studied pulse. The test pulse may e.g. be a 0.5 ps pulse to measure the shape of a 50 ps pulse. In principle, a test pulse shaped as a delta function is preferred, since the studied pulse then occurs directly by the cross-correlation.

The cross-correlator shown in FIG. 5 corresponds in principle to the autocorrelator, there being merely used different pulse flows in the two arms 41 and 42 in the interferometer. Short pulses are used in the one arm 41 as test pulses to measure on the pulses which are transmitted into the other arm 42 of the interferometer. The pulse flows in the two arms 41, 42 are combined by a fibre optical coupler 45 and are directed into an active fibre 46. Of course, it must be demanded that the repetition frequencies of the two pulse trains are the same or at any rate commensurable. Detection of the fluorescence from the multi-photon process in the active fibre 46 takes place in the same manner as in the autocorrelator by means of a filter 47 and a sensitive detector 48.

Figure 6:
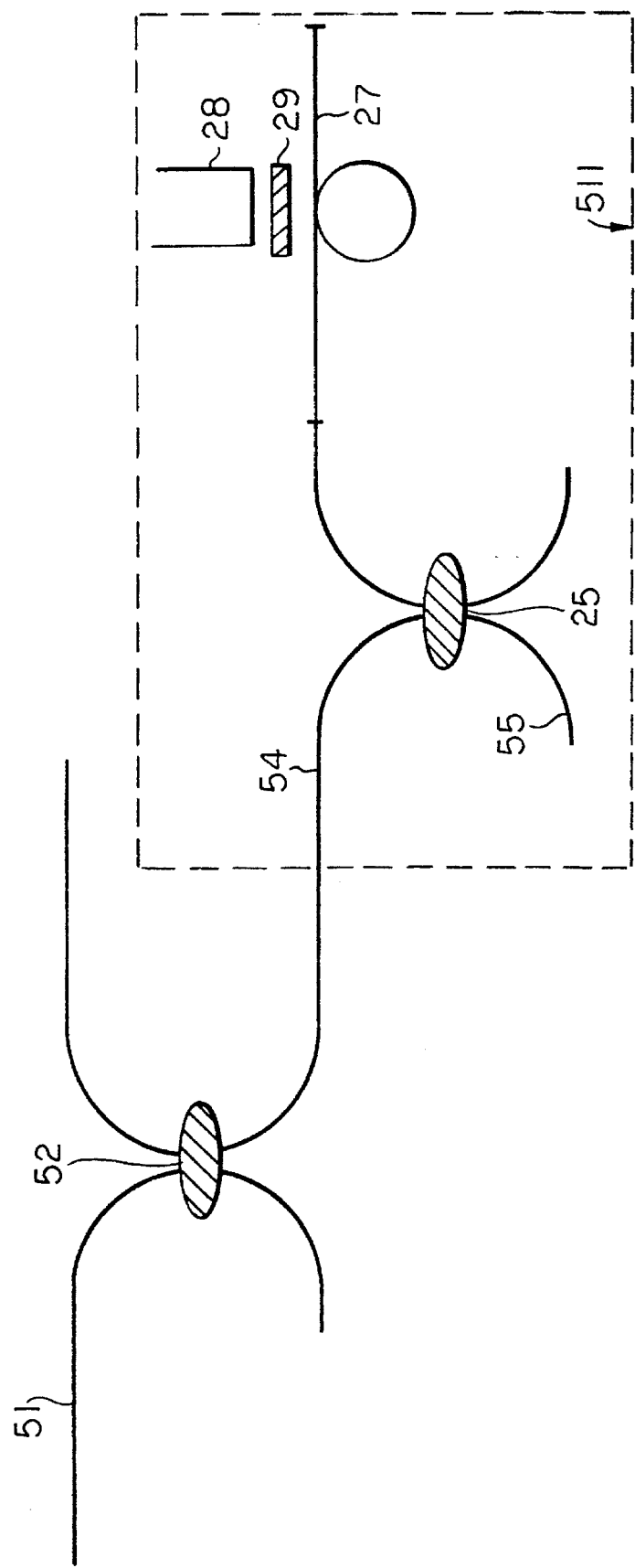
FIG. 6 is an outline diagram of a preferred embodiment of a clock generator according to the invention.

FIG. 6 shows a special use of a cross-correlator. In optical communications systems information is transmitted in the form of light pulses. These are transmitted with a firm repetition frequency. Bits in the form of 1 and 0 are transmitted as light pulses, so that e.g. 1's are represented by a light pulse, while an 0 is represented by no light pulse. When such pulses are to be detected, the arrival time of the pulses must be known. It is therefore necessesary to have a clock locally where the detection takes place, synchronized with the pulses to be received. This can be obtained by transmitting, by means of a fibre optical coupler 52, part of the bit flow from a fibre 51 into a first arm 54 in the cross-correlator. The second arm 55 of the cross-correlator is coupled to a pulse flow having a repetition frequency which is equal to or commensurable with the bit flow. The local clock can now be synchronized with the delay time at which maximum fluorescence is obtained from the cross-correlator, which is generally designated 511. This problem of making a clock regenerator is particularly important in very fast communications systems where the repetition frequency is equal to or above 10 GHz. Since the life of the fluorescence is of the order of a few µs, it will be seen that the delay time is measured averaged over many bits, and the alternating 0's and 1's in the pulse flow will therefore not give rise to variations in the fluorescence output from the cross-correlator.

We claim:

1. A method of correlating two or more optical pulse signals by passing one of them through respective optical paths of which at least one has a variable delay element so that the pulse signals can be delayed temporally with respect to each other, said correlation between the pulse signals being determined in response to the interaction of the signals with a photoreactive element, characterized by passing the pulse signals to an active, optical wave guide doped with optical, active ions, detecting fluorescence originating from the combination of the optical signals with the active ions, and determining the correlation between the pulse signals in response to the detected fluorescence.

2. A device for correlating two or more optical pulse signals, comprising respective optical paths for the pulse signals, at least one of said paths having a variable delay element so that the pulse signals can be delayed temporally with respect to each other, as well as a photoreactive element which, by interaction with the signals, emits a signal by means of which the correlation of the pulse signals can be determined, characterized in that the device comprises an active, optical wave guide as the photoreactive element to which the pulse signals are applied, said wave guide being doped with optical, active ions, a detector arranged in connection with the wave guide to detect fluorescence originating from the wave guide as a consequence of the combination of the optical signals with the active ions, and a unit for computing the correlation between the pulse signals in response to the detected fluorescence.

3. A device according to claim 2, characterized in that the detector is arranged co-axially with the wave guide and detects the fluorescence in the transverse direction of the wave guide.

4. A device according to claim 2, characterized in that the doping material in the wave guide is selected such that the fluorescence is provided by multi-photon absorption, preferably a two- or three-photon absorption.

5. A device according to claim 2, characterized in that the pulse width of the signals is of the order of 5 femtoseconds—500 picoseconds.

6. A device according to claim 2, characterized in that the respective optical paths comprise optical transmission fibres which are coupled together and coupled to the wave guide via fibre couplers.

7. A device according to claim 6, characterized in that the delay element in one transmission fibre is a piezoelectric crystal.

8. A device according to claim 6, characterized in that it has an input for coupling to a signal-guiding optical fibre, that the input is followed by a branch element in the direction of propagation so that the arrived signal is split up into two substantially identical signals which are both applied to the wave guide, the two split signals being delayed with respect to each other such that the computing unit computes the autocorrelation of the arrived signal.

9. A device according to claim 6, characterized in that it has an input for coupling to a signal-guiding optical fibre as well as an input connected with a signal generator for a reference pulse signal, said computing unit computing the cross-correlation between the arrived signal and the reference pulse signal.

10. A device according to claim 9, characterized in that the frequency of the reference pulse signal is selected so that the pulse frequency of the arrived signal is an integer multiple of the frequency of the reference pulse signal or vice versa, whereby a clock signal generator for the arrived signal can be controlled in response to the size of the delay introduced by the delay element which gives maximum correlation between the signals.

\* \* \* \* \*

UNITED STATES PATENT AND TRADEMARK OFFICE
CERTIFICATE OF CORRECTION

PATENT NO. : 5,513,284
DATED : April 30, 1996
INVENTOR(S) : Jan Thøgersen and Jannik Mark It is certified that error appears in the above-indentified patent and that said Letters Patent is hereby corrected as shown below:

ON TITLE PAGE, Item:

[22] PCT FILED: JUNE 15, 1993

[86] PCT NO.: PCT/DK93/00201

§371 DATE: FEB. 1, 1995

§102(e) DATE: FEB. 1, 1995

[87] PCT PUB. NO.: WO 93/25934

PCT PUB. DATE: DEC. 23, 1993

Signed and Sealed this

Twentieth Day of August, 1996

Attest:

BRUCE LEHMAN

*Attesting Officer*    *Commissioner of Patents and Trademarks*